(12) United States Patent  
Gao et al.

(10) Patent No.: US 10,013,054 B2  
(45) Date of Patent: Jul. 3, 2018

(54) CONTROL METHOD AND ELECTRONIC DEVICE

(71) Applicants: Beijing Lenovo Software Ltd., Beijing (CN); Lenovo (Beijing) Co., Ltd., Beijing (CN)

(72) Inventors: Ge Gao, Beijing (CN); Yan Gao, Beijing (CN); Xiaotian Zhu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 220 days.

(21) Appl. No.: 14/757,408

(22) Filed: Dec. 23, 2015

(65) Prior Publication Data

US 2017/0090558 A1  Mar. 30, 2017

(30) Foreign Application Priority Data

Sep. 29, 2015  (CN) .......................... 2015 1 0634797

(51) Int. Cl.
*G06F 3/01* (2006.01)
*G06F 3/0346* (2013.01)
(Continued)

(52) U.S. Cl.
CPC .............. *G06F 3/013* (2013.01); *G06F 3/014* (2013.01); *G06F 3/0304* (2013.01);
(Continued)

(58) Field of Classification Search
None
See application file for complete search history.

(56) References Cited

U.S. PATENT DOCUMENTS 9,639,119 B2    5/2017  Seok et al.
9,651,992 B2 *  5/2017  Stotler ................... G06F 1/163
(Continued)

FOREIGN PATENT DOCUMENTS

CN        102592569 A       7/2012
WO    WO-2015056931 A1     4/2015
WO    WO-2015126179 A1     8/2015

OTHER PUBLICATIONS

First Chinese Office Action regarding Application No. 201510634797.5 dated Dec. 5, 2017. English translation provided by http://globaldossier.uspto.gov.

*Primary Examiner* — Kenneth B Lee, Jr.
(74) *Attorney, Agent, or Firm* — Harness, Dickey & Pierce, P.L.C.

(57) ABSTRACT

An electronic device is provided, which includes: a maintaining body having at least a maintained state, where the maintaining body is capable of functioning as at least one portion of a ring or at least one portion of an approximate ring meeting a first condition, and the electronic device is maintained on an object via the maintaining body; a display including at least a first display portion and a second display portion, where the first display portion and the second display portion cannot be observed simultaneously in a case that the maintaining body is in the maintained state; and a controller configured to determine a display region for a content to be displayed among the first display portion and the second display portion, and control the content to be displayed to be displayed in the determined display region. A control method is further provided.

27 Claims, 6 Drawing Sheets

(51) Int. Cl.
*G06F 3/03* (2006.01)
*G09G 5/10* (2006.01)

(52) U.S. Cl.
CPC ............. *G06F 3/0346* (2013.01); *G09G 5/10* (2013.01); *G09G 2330/021* (2013.01)

(56) References Cited

U.S. PATENT DOCUMENTS

| | | |
|---|---|---|
| 2015/0062160 A1 | 3/2015 | Sakamoto et al. |
| 2015/0241917 A1 | 8/2015 | Seok et al. |
| 2016/0124395 A1 | 5/2016 | Lee |
| 2016/0379398 A1* | 12/2016 | Vaughn .................. G06T 13/80 345/473 |
| 2017/0083046 A1 | 3/2017 | Seok et al. |
| 2017/0090512 A1 | 3/2017 | Seok et al. |

* cited by examiner

| determine, based on the content to be displayed, a display region for the content to be displayed in the first display portion and the second display portion | — S901 |

↓

| control the content to be displayed to be displayed in the determined display region | — S902 |

CONTROL METHOD AND ELECTRONIC DEVICE

CROSS REFERENCE TO RELATED APPLICATIONS

The present application claims the priority to Chinese Patent Application No. 201510634797.5, titled "CONTROL METHOD AND ELECTRONIC DEVICE", filed on Sep. 29, 2015 with the State Intellectual Property Office of People's Republic of China, the content of which is incorporated herein by reference.

FIELD

The present disclosure relates to the field of controlling an electronic device, and in particular to a control method and an electronic device.

BACKGROUND

With the continuous development of science and technology, the electronic technology is developed quickly, the variety of electronic products is increasing, and people enjoy various conveniences brought by the science and technology. Presently, people may enjoy a comfortable life brought by the science and technology via various types of intelligent terminals.

Presently, an electronic device such as a smart watch and a smart bracelet is worn by more and more people. In order to fit well a curved surface of a wrist of a user, a display screen of the electronic device is designed to be curved. There is a problem that a visible region of the display screen cannot cover the whole screen, that is, a user cannot observe the whole display screen simultaneously, and the electronic device cannot control the display screen locally, which causes that the user has to rotate a wrist to observe the whole display screen.

Hence, an intelligent level of the electronic device is low and the user operates the electronic device inconveniently in the conventional technology.

SUMMARY

In view of the above, a control method and an electronic device are provided according to embodiments of the present disclosure, so as to improve an intelligence level of an electronic device, facilitate a user to operate the electronic device and provide good user experience.

In order to realize the above object, technical solutions of the present disclosure are implemented as follows.

In a first aspect, an electronic device is provided according to an embodiment of the present disclosure, which includes: a maintaining body having at least a maintained state, where the maintaining body is capable of functioning as at least one portion of a ring or at least one portion of an approximate ring meeting a first condition, and the electronic device is maintained on an object via the maintaining body; a display including at least a first display portion and a second display portion, where the first display portion and the second display portion are not observed simultaneously in a case that the maintaining body is in the maintained state; and a controller configured to determine a display region for the content to be displayed among the first display portion and the second display portion, and control the content to be displayed to be displayed in the determined display region.

In a second aspect, a control method is provided according to an embodiment of the present disclosure, which includes: determining a display region for a content to be displayed in a first display portion and a second display portion of a display arranged on an electronic device, where the electronic device includes a maintaining body and a display, the maintaining body has at least a maintained state, the maintaining body is capable of functioning as at least one portion of a ring or at least one portion of an approximate ring meeting a first condition, the electronic device is maintained on an object via the maintaining body, the display includes at least a first display portion and a second display portion, and the first display portion and the second display portion are not be observed simultaneously in a case that the maintaining body is in the maintained state; and controlling the content to be displayed to be displayed in the determined display region.

A method and an electronic device are provided according to the embodiments of the present disclosure. The electronic device includes a maintaining body, a display and a controller. The maintaining body has at least a maintained state and is capable of functioning as at least one portion of a ring or at least one portion of an approximate ring meeting the first condition; the electronic device is maintained on an object via the maintaining body; the display includes at least a first display portion and a second display portion, and the first display portion and the second display portion cannot be observed simultaneously in a case that the maintaining body is in the maintained state; the controller may determine a display region for the content to be displayed among the first display portion and the second display portion, and control the content to be displayed to be displayed in the determined display region.

DETAILED DESCRIPTION OF THE EMBODIMENTS

Hereinafter technical solutions in embodiments of the present disclosure are described clearly and completely in conjunction with the drawings in the embodiments of the present disclosure.

First Embodiment

Figure 1:
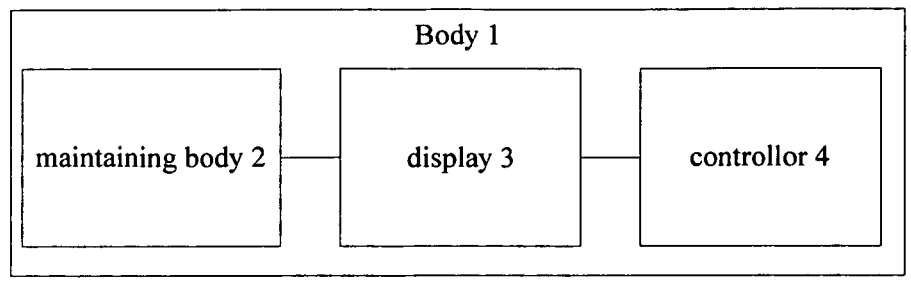
FIG. 1 is a schematic structural diagram of an electronic device according to a first embodiment of the present disclosure.

An electronic device is provided according to the first embodiment, which may be a smart watch or a smart bracelet or the like. As shown in FIG. 1, the electronic device includes a body 1, a maintaining body 2, a display 3 and a controller 4.

At least one electronic component is accommodated in the body 1, for example, a processor, a power management module and a controller, which can achieve at least one function.

The maintaining body 2 is arranged on the body 1 and has at least a maintained state. The maintaining body 2 is capable of functioning as at least one portion of a ring or at least one portion of an approximate ring meeting a first condition. The body 1 is maintained on an object via the maintaining body 2.

It is to be noted that, an opening is provided on the ring, to form the approximate ring described above, the approximate ring meeting the first condition means that a length of the opening of the approximate ring is short and the length of the opening is less than a caliber of an object on which the maintaining body 2 is maintained in a case that the maintaining body 2 is in the maintained state, that is, the length of the opening is less than a half of a circumference of the approximate ring, and a central angle of the opening is less than 180 degrees.

Furthermore, in a case that the maintaining body 2 is in the maintained state, the ring or the approximate ring can be maintained on or surround a columnar object. In this case, a caliber of the columnar object has to meet a second condition, that is, the caliber of the columnar object is less than the caliber of the ring or the approximate ring. In order to prevent the maintaining body 2 in the maintained state from falling away from the columnar object, a caliber of at least one end of the columnar object is greater than the caliber of the ring or the approximate ring.

During a specific implementation process, the maintaining body 2 and the body 1 may be connected in the following two ways, but the connection way is not limited in the present disclosure.

In a first way, the body 1 has two opposite ends and the maintaining body 2 is connected to the two ends. In this way, a ring or an approximate ring may be formed with the maintaining body 2 and the body 1, and the maintaining body 2 is a portion of the ring or the approximate ring. In this case, the maintaining body 2 is in a maintained state and can maintain the body 1 on an object. The object may be a columnar object, for example, a wrist of a person.

Figure 2A:
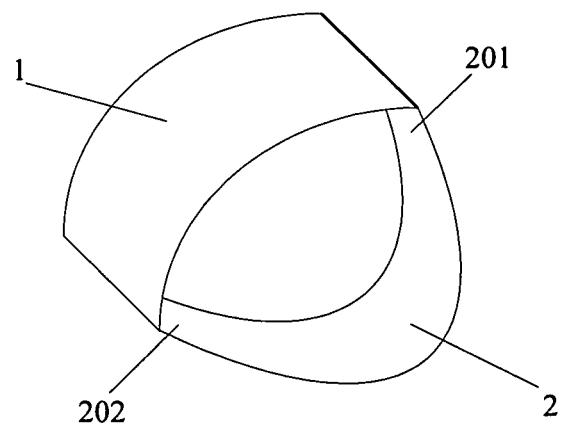
FIG. 2A and FIG. 2B are schematic diagrams showing a connection relationship between a maintaining body and a body according to the first embodiment to a fourth embodiment of the present disclosure.
Figure 2B:
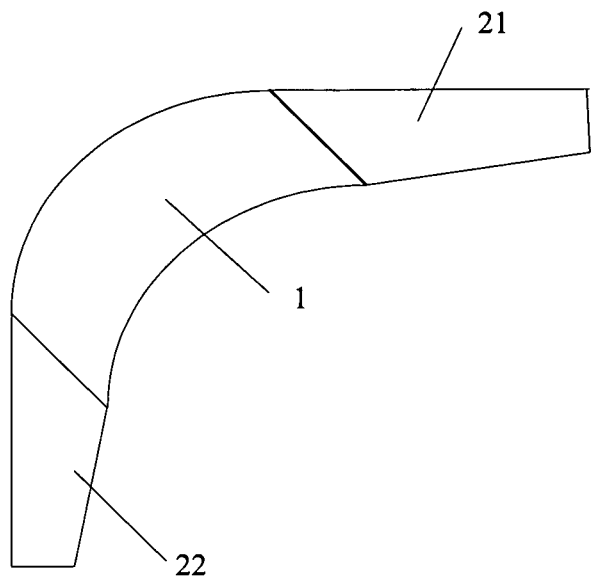

Furthermore, the maintaining body 2 may be a whole component connected to the two ends of the body 1, or may be composed of multiple sub-components. For example, as shown in FIG. 2A, the maintaining body 2 is a strap-shaped component having a first end 201 and a second end 202, the first end 201 is connected to one end of the body 1, and the second end 202 is connected to the other end of the body 1. In a case that the first end 201 and the second end 202 of the maintaining body 2 are connected to two ends of the body 1 respectively, the maintaining body 2 is in a maintained state and is capable of maintaining the body 1 on the above object. Alternatively, as shown in FIG. 2B, the maintaining body 2 includes two sub-components; one end of a first sub-component 21 is connected to one end of the body 1, and the other end of the first sub-component 21 is a free end; and one end of a second sub-component 22 is connected to the other end of the body 1, and the other end of the second sub-component 22 is a free end. In this case, the maintaining body 2 is shaped like a strap of a smart watch, and the maintaining body 2 is in a maintained state and is capable of maintaining the body 1 on the above object, in a case that the free end of the first sub-component 21 is connected to the free end of the second sub-component 22.

In a second way, the body 1 is arranged on an external surface of the maintaining body 2. For example, the body 1 is attached on the external surface of the maintaining body 2 or the body 1 may be embedded into the maintaining body 2 and be exposed at the external surface of the maintaining body 2. Since the maintaining body 2 bears the body 1, the maintaining body 2 is a whole component and has a first end and a second end. In a case that the first end and the second end of the maintaining body 2 are connected to each other, a ring or an approximate ring is formed with the maintaining body 2 itself. In this case, the maintaining body 2 is in a maintained state and is capable of maintaining the body 1 on the above object.

It is to be noted that, the above-described "connection way" may be a maintained connection or a separable connection. The maintained connection may include screw jointing, welding and bonding and so on, and the separable connection may include engaging and magnetic adhesion and so on.

In the embodiment, a display 3 and a controller 4 are further arranged in the body 1.

Specifically, the display 3 is arranged on an external surface of the body 1, i.e., an outer surface of the ring/approximate ring, and includes at least a first display portion and a second display portion. In a practical application, the display 3 may be a curved display which is not deformable or a flexible display which is deformable. In a case that the maintaining body 2 is in the maintained state, the first display portion and the second display portion cannot be observed simultaneously, that is, in a case that the body 1 is maintained on an object via the maintaining body 2, the display 3 cannot be observed completely by an observer, and the observer can only observe the first display portion or the second display portion. Furthermore, in addition to the maintained state, the maintaining body 2 may have a non-maintained state. In a case that the first end of the maintaining body 2 is separated from the second end of the maintaining body 2, the maintaining body 2 is capable of falling away from the object on which the maintaining body 2 is maintained. For example, the electronic device is a smart watch, the maintaining body 2 is a strap, and the maintaining body 2 can be maintained on a wrist of the user; in a case that the user wants to remove the smart watch, the user may open the strap, and the strap of the smart watch, i.e., the maintaining body 2, is in a non-maintained state. Practically, if the electronic device is a smart bracelet or a smart bangle, the maintaining body 2 has only the maintained state, which is not limited in the present disclosure.

In a case that the display 3 is a flexible display and the maintaining body 2 is in a maintained state, the electronic device is maintained on an object, and the display 3 is deformed to present a curved surface to fit an external surface of the object. In a case that the maintaining body 2 is in the non-maintained state, the display 3 is deformed, such that the first display portion and the second display portion can be observed simultaneously. In this case, the display 3 may be deformed to present a curved surface with a great curvature, or bent in an opposite direction, even stretched to present a plane surface. In a practical application, in a case that the display 3 is stretched to present a plane surface, the electronic device may function as a smartphone.

The controller 4 may be a processor, for example, a CPU or a DSP, which is not limited in the present disclosure.

A control method according to the embodiment is described in conjunction with the above electronic device, and it is assumed that the display includes only a first display portion and a second display portion as an example.

In a practical application, the display may include multiple display portions, and a display region for a content to be displayed may be determined among the multiple display portions, which is not limited in the present disclosure.

Figure 3:
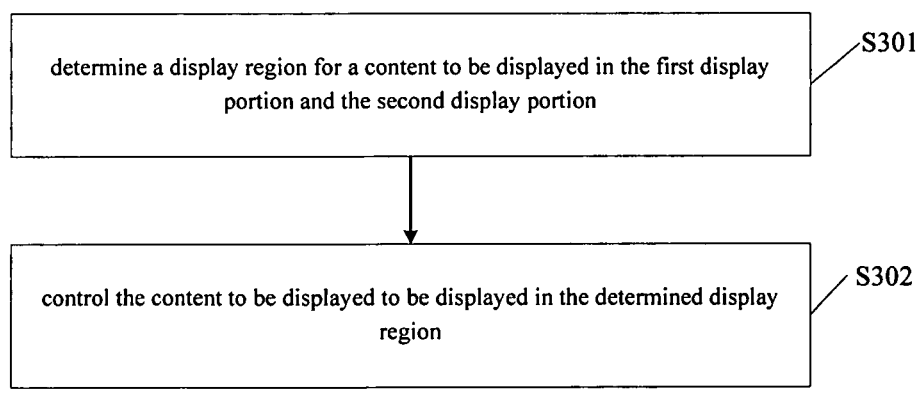
FIG. 3 is a flowchart of a control method according to the first embodiment of the present disclosure.

As shown in FIG. 3, the method includes step S301 and step S302.

In step S301, a display region for a content to be displayed is determined in a first display portion and a second display portion.

Specifically, in a case that the body is maintained on an object via the maintaining body, for example, a smart watch is maintained on a wrist of a user, the user cannot observe a display region of the whole display simultaneously since the display presents a curved surface. In order to ensure the normal use of the electronic device and facilitate the user to observe the complete content to be displayed, the controller may determine a user visible region among the first display portion and the second display portion to display the content to be displayed, based on a current posture of the electronic device or by tracking sight of the user, and the determined user visible region is the display region for the content to be displayed. Alternatively, in order to improve information safety of the electronic device and prevent personal privacy from being leaked, the controller may determine, among the first display portion and the second display portion, a portion which can be observed only by the user of the electronic device and cannot be observed by other observers to display the content to be displayed, and the determined portion is the display region for the content to be displayed.

In step S302, the content to be displayed is controlled to be displayed in the determined display region.

Specifically, after the display region for the content to be displayed is determined, the controller displays the content to be displayed in the determined display region.

The smart watch is taken as an example, in a case that the smart watch is worn on a wrist of the user and the user raises the wrist to observe the display, the controller may determine a visible region for the user, for example, the first display portion, based on a current posture of the smart watch or by sensing sight of the user, and then the controller controls the content to be displayed to be displayed in the first display portion. Alternatively, the controller may determine any display portion of the first display portion and the second portion as the display region for the content to be displayed, and then controls the content to be displayed to be displayed in the display region.

In the embodiment, the electronic device may control the complete content to be displayed to be displayed in only one display portion of the display, and the user may observe the complete content to be displayed in only one display portion without rotating the wrist continuously in observing the content to be displayed. In addition, if the user rotates the wrist, the electronic device can control one display portion of the display to display the content to be displayed, that is, a display position of the content to be displayed is adaptive to the current posture of the electronic device. Therefore, the user can observe easily the content to be displayed, an intelligence level of the electronic device is improved, it is convenient for the user to operate the electronic device, and good user experience is provided.

Second Embodiment

Figure 4:
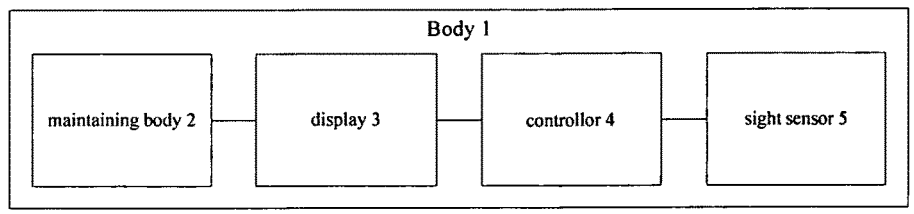
FIG. 4 is a schematic structural diagram of an electronic device according to a second embodiment of the present disclosure.

An electronic device is provided according to the second embodiment, which may be a smart watch and a smart bracelet and so on. As shown in FIG. 4, the electronic device includes a body 1, a maintaining body 2, a display 3, a controller 4 and a sight sensor 5.

At least one electronic component is accommodated in the body 1, for example, a processor, a power management module, and a controller, which can achieve at least one function.

The maintaining body 2 is arranged on the body 1 and has at least a maintained state. The maintaining body 2 is capable of functioning as at least one portion of a ring or at least one portion of an approximate ring meeting a first condition. The body 1 is maintained on an object via the maintaining body 2.

It is to be noted that, an opening is provided on a ring, to form the approximate ring described above, the approximate ring meeting the first condition means that: a length of the opening of the approximate ring is short and the length of the opening is less than a caliber of an object on which the maintaining body 2 is maintained in a case that the maintaining body 2 is in the maintained state, that is, the length of the opening is less than a half of a circumference of the approximate ring, and a central angle of the opening is less than 180 degrees.

Furthermore, in a case that the maintaining body 2 is in the maintained state, the ring or the approximate ring can be maintained on or surround a columnar object. In this case, a caliber of the columnar object has to meet a second condition, that is, the caliber of the columnar object is less than the caliber of the ring or the approximate ring. In order to prevent the maintaining body 2 in the maintained state from falling away from the columnar object, a caliber of at least one end of the columnar object is greater than the caliber of the ring or the approximate ring.

During a specific implementation process, the maintaining body 2 and the body 1 may be connected in the following two ways, but the connection way is not limited in the present disclosure.

In a first way, the body 1 has two opposite ends and the maintaining body 2 is connected to the two ends. In this way, a ring or an approximate ring may be formed with the maintaining body 2 and the body 1, and the maintaining body 2 is a portion of the ring or the approximate ring. In this case, the maintaining body 2 is in a maintained state and can maintain the body 1 on an object. The object may be a columnar object, for example, a wrist of a person.

Furthermore, the maintaining body 2 may be a whole component connected to the two ends of the body 1, or may be composed of multiple sub-components. For example, as shown in FIG. 2A, the maintaining body 2 is a strap-shaped component having a first end and a second end, the first end is connected to one end of the body 1, and the second end is connected to the other end of the body 1. In a case that the first end and the second end of the maintaining body 2 are connected to two ends of the body 1 respectively, the maintaining body 2 is in a maintained state and is capable of maintaining the body 1 on the above object. Alternatively, as shown in FIG. 2B, the maintaining body 2 includes two sub-components; one end of a first sub-component 21 is connected to one end of the body 1, and the other end of the first sub-component 21 is a free end; and one end of a second sub-component 22 is connected to the other end of the body 1, and the other end of the second sub-component 22 is a free end. In this case, the maintaining body 2 is shaped like a strap of a smart watch, and the maintaining body 2 is in a maintained state and is capable of maintaining the body 1 on the above object, in a case that the free end of the first sub-component 21 is connected to the free end of the second sub-component 22.

In a second way, the body 1 is arranged on an external surface of the maintaining body 2. For example, the body 1 is attached on the external surface of the maintaining body 2 or the body 1 may be embedded into the maintaining body 2 and be exposed at the external surface of the maintaining body 2. Since the maintaining body 2 bears the body 1, the maintaining body 2 is a whole component and has a first end and a second end. In a case that the first end and the second end of the maintaining body 2 are connected to each other, a ring or an approximate ring is formed with the maintaining body 2 itself. In this case, the maintaining body 2 is in a maintained state and is capable of maintaining the body 1 on the above object.

It is to be noted that, the above-described "connection way" may be a maintained connection or a separable connection. The maintained connection may include screw jointing, welding and bonding and son on, and the separable connection may include engaging and magnetic adhesion and so on.

In the embodiment, a display 3 and a controller 4 are further arranged in the body 1.

Specifically, the display 3 is arranged on an external surface of the body 1, i.e., an outer surface of the ring/approximate ring, and includes at least a first display portion and a second display portion. In a practical application, the display 3 may be a curved display which is not deformable or a flexible display which is deformable. In a case that the maintaining body 2 is in the maintained state, the first display portion and the second display portion cannot be observed simultaneously, that is, in a case that the body 1 is maintained on an object via the maintaining body 2, the whole display 3 cannot be observed completely by an observer, and the observer can only observe the first display portion or the second display portion. Furthermore, in addition to the maintained state, the maintaining body 2 may have a non-maintained state. In a case that the first end of the maintaining body 2 is separated from the second end of the maintaining body 2, the maintaining body 2 is capable of falling away from the object on which the maintaining body 2 is maintained. For example, the electronic device is a smart watch, the maintaining body 2 is a strap, and the maintaining body 2 can be maintained on a wrist of the user; in a case that the user wants to remove the smart watch, the user may open the strap, and the strap, i.e., the maintaining body 2, is in a non-maintained state. Practically, if the electronic device is a smart bracelet or a smart bangle, the maintaining body 2 has only the maintained state, which is not limited in the present disclosure.

In a case that the display 3 is a flexible display and the maintaining body 2 is in a maintained state, the electronic device is maintained on an object, and the display 3 is deformed to present a curved surface to fit an external surface of the object. In a case that the maintaining body 2 is in the non-maintained state, the display 3 is deformed, such that the first display portion and the second display portion can be observed simultaneously. In this case, the display 3 may be deformed to present a curved surface with a great curvature, or bent in an opposite direction even stretched to present a plane surface. In a case that the display 3 is stretched to present a plane surface, the electronic device may function as a smartphone.

The controller 4 may be a processor, for example, a CPU or a DSP, which is not limited in the present disclosure.

The sight sensor 5 is connected to the controller 4 and includes at least two sight sensing elements which are arranged uniformly at a position on the body 1 close to an edge of the display 3, such that a collecting region of the sight sensor 5 overlaps with an observation region of the display 3. In this way; a sight of an observer can be collected by the sight sensor 5 no matter whether the observer observes the observation region of the first display portion or the observation region of the second display portion. Specifically, the sight sensor 5 may be an image acquisition sensor array; in this case, the image acquisition sensor array is arranged on the display 3, and one pixel point is composed of one image acquisition sensor and one RGB point. Practically, the sight sensor 5 may be in other forms, which is not limited in the present disclosure.

Hereinafter a control method according to the embodiment is described in conjunction with the above electronic device, and it is assumed that the display includes only a first display portion and a second display portion as an example.

In a practical application, the display may include multiple display portions, and a display region for a content to be displayed may be determined among the multiple display portions, which is not described in the present disclosure.

Figure 5:
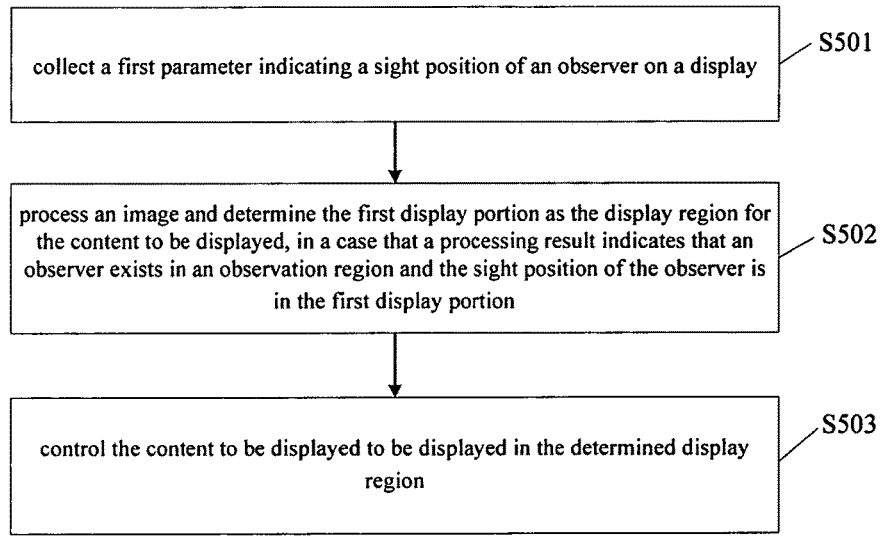
FIG. 5 is a flowchart of a control method according to the second embodiment of the present disclosure.

As shown in FIG. 5, the method includes step S501 to step S503.

In step S501, a first parameter indicating a sight position of an observer on the display is collected.

For example, it is assumed that the sight sensor is an image acquisition sensor, the image acquisition sensor may acquire an image in an observation region of the display, i.e., the first parameter.

In step S502, the image is processed and the first display portion is determined as the display region for the content to be displayed in a case that a processing result indicates that an observer exists in the observation region and a sight position of the observer is in the first display portion.

Specifically, the controller processes the image to determine whether an observer exists in the observation region of the display and obtain sight information of the observer. The controller can determine the sight position of the observer on the display based on the sight information. The first display portion is determined as the display region for the content to be displayed, in a case that the processing result indicates that the observer exists in the observation region and the sight position of the observer is in the first display portion. That is, the controller determines a visible region for the observer as the display region for the content to be displayed.

In step S503, the content to be displayed is controlled to be displayed in the determined display region.

That is, the content to be displayed is controlled to be displayed in the first display portion.

During a specific implementation process, in a case that the content to be displayed is displayed in the second display portion all the time, after the controller determines the first display portion as the display region for the content to be displayed, the controller controls the display region for the content to be displayed to be switched from the second display portion to the first display region. In this case, the first display portion is in a first power consumption state, for example, the content to be displayed is displayed with a first backlight brightness. Furthermore, a power consumption state of the first display portion may be switched from other power consumption sates to the first power consumption state, for example, a backlight brightness for the first display portion is switched from a second backlight brightness to the first backlight brightness, and the second backlight brightness can only illuminate the first display portion. Practically, the first display portion may have other first power consumption states, which is not limited in the present disclosure.

Furthermore, since the content to be displayed is displayed in the first display portion, the second display portion is not in use, and the controller may control a power consumption mode of the second display portion to be switched from the first power consumption mode to the second power consumption mode, for example, the second display portion is turned off, the backlight brightness of the second display portion is decreased or a preset image is displayed in the second display portion, for example, a complete black image, a dark image or a dull color image. Practically, the second display portion may be controlled in the second power consumption in other ways, as long as power consumption in a case that the second display portion is in the first power consumption mode is greater than power consumption in a case that the second display portion is in the second power consumption mode, which is not limited in the present disclosure.

For example, in a case that the content to be displayed is displayed in a visible region for the observer, i.e., the first display portion, the second display portion, i.e., a non-visible region for the observer, is controlled to be in the second power consumption state, thereby greatly reducing power consumption of the display, reducing power consumption of the whole electronic device, and extending a battery life. In another embodiment, the content to be displayed may be a useful content, i.e., a content which the user wants to observe, for example, time information in a standby interface; the controller may control only the time information to be displayed in the first display portion, and control useless information to be displayed in the second display portion, for example, a background image in the standby interface. In this way, only the useful content is displayed in the visible region for the user, i.e., the first display portion, and it is convenient for the user to observe the useful content.

Practically, the useful content and the useless content may refer to other contents, which is not limited in the present disclosure.

In another embodiment, before step S501, the method may further include: determining whether the content to be displayed is a preset content. Accordingly, in a case that the content to be displayed is determined to be the preset content, step S501 to step S503 are performed.

Specifically, firstly, it is determined whether the content to be displayed is the preset content, for example, a short message sent from a specified sender, a photo in an album which can be observed only by the observer oneself or an e-mail with a high priority. If the content to be displayed is determined to be the preset content, a first parameter indicating a sight position of an observer on the display is collected by the sight sensor. Then the first parameter is processed and the first display portion is determined as a display region for the content to be displayed in a case that a processing result indicates that the sight position is in the first display portion. That is, the preset content is displayed in a visible region for the user, thereby avoiding omission of the user's important information and preventing privacy of the user from being leaked.

In the embodiment, the content to be displayed is controlled to be displayed in the visible region for the user by determining the sight position of the observer on the display, therefore the user can directly observe the content to be displayed, and it is convenient for the user. In addition, the non-visible region for the user is controlled to be in a second power consumption state, thereby reducing power consumption of the electronic device and extending a battery life.

Third Embodiment

Figure 6:
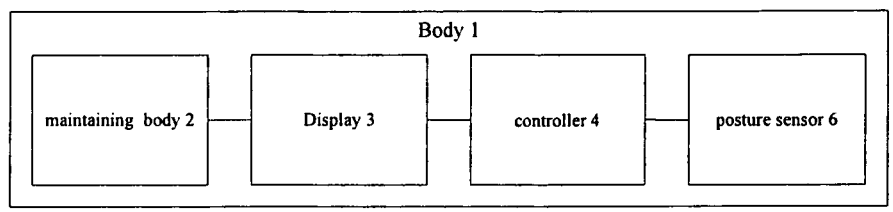
FIG. 6 is a schematic structural diagram of an electronic device according to a third embodiment of the present disclosure.

An electronic device is provided according to the third embodiment, which may be a smart watch and a smart bracelet or the like. As shown in FIG. 6, the electronic device includes a body 1, a maintaining body 2, a display 3, a controller 4 and a posture sensor 6.

At least one electronic component is accommodated in the body. 1, for example, a processor, a power management module, and a controller, which can achieve at least one function.

The maintaining body 2 is arranged on the body 1 and has at least a maintained state. The maintaining body 2 is capable of functioning as at least one portion of a ring or at least one portion of an approximate ring meeting a first condition. The body 1 is maintained on an object via the maintaining body 2.

It is to be noted that, an opening is provided on the ring, to form the approximate ring described above, the approximate ring meeting the first condition means that a length of the opening of the approximate ring is short and the length of the opening is less than a caliber of an object on which the maintaining body 2 is maintained in a case that the maintaining body 2 is in the maintained state, that is, the length of the opening is less than a half of a circumference of the approximate ring, and a central angle of the opening is less than 180 degrees.

Furthermore, in a case that the maintaining body 2 is in the maintained state, the ring or the approximate ring can be maintained on or surround a columnar object. In this case a caliber of the columnar object has to meet a second condition, that is, the caliber of the columnar object is less than the caliber of the ring or the approximate ring. In order to prevent the maintaining body 2 in the maintained state from falling away from the columnar object, a caliber of at least one end of the columnar object is greater than the caliber of the ring or the approximate ring.

During a specific implementation process, the maintaining body 2 and the body 1 may be connected in the following two ways, but the connection way is not limited in the present disclosure.

In a first way, the body 1 has two opposite ends and the maintaining body 2 is connected to the two ends. In this way, a ring or an approximate ring may be formed with the maintaining body 2 and the body 1, and the maintaining body 2 is a portion of the ring or the approximate ring. In this case, the maintaining body 2 is in a maintained state and can maintain the body 1 on an object. The object may be a columnar object, for example, a wrist of a person.

Furthermore, the maintaining body 2 may be a whole component connected to the two ends of the body 1, or may be composed of multiple sub-components. For example, as shown in FIG. 2A, the maintaining body 2 is a strap-shaped component having a first end and a second end, the first end is connected to one end of the body 1, and the second end is connected to the other end of the body 1. In a case that the first end and the second end of the maintaining body 2 are connected to two ends of the body 1 respectively, the maintaining body 2 is in a maintained state and is capable of maintaining the body 1 on the above object. Alternatively, as shown in FIG. 2B, the maintaining body 2 includes two sub-components; one end of a first sub-component 21 is connected to one end of the body 1, and the other end of the first sub-component 21 is a free end; and one end of a second sub-component 22 is connected to the other end of the body 1, and the other end of the second sub-component 22 is a free end. In this case, the maintaining body 2 is shaped like a strap of a smart watch, and the maintaining body 2 is in a maintained state and is capable of maintaining the body 1 on the above object in a case that the free end of the first sub-component 21 is connected to the free end of the second sub-component 22.

In a second way, the body 1 is arranged on an external surface of the maintaining body 2. For example, the body 1 is attached on the external surface of the maintaining body 2 or the body 1 may be embedded into the maintaining body 2 and be exposed at the external surface of the maintaining body 2. Since the maintaining body 2 bears the body 1, the maintaining body 2 is a whole component and has a first end and a second end. In a case that the first end and the second end of the maintaining body 2 are connected to each other, a ring or an approximate ring is formed with the maintaining body 2 itself. In this case, the maintaining body 2 is in a maintained state and is capable of maintaining the body 1 on the above object.

It is to be noted that, the above-described "connection way" may be a maintained connection or a separable connection. The maintained connection may include screw jointing, welding and bonding and son on, and the separable connection may include engaging and magnetic adhesion and so on.

In the embodiment, a display 3 and a controller 4 are further arranged in the body 1.

Specifically, the display 3 is arranged on an external surface of the body 1, i.e., an outer surface of the ring/approximate ring, and includes at least a first display portion and a second display portion. In a practical application, the display 3 may be a curved display which is not deformable or a flexible display which is deformable. In a case that the maintaining body 2 is in the maintained state, the first display portion and the second display portion cannot be observed simultaneously, that is, in a case that the body 1 is maintained on an object via the maintaining body 2, the whole display 3 cannot be observed completely by an observer, and the observer can only observe the first display portion or the second display portion. Furthermore, in addition to the maintained state, the maintaining body 2 may have a non-maintained state. In a case that the first end of the maintaining body 2 is separated from the second end of the maintaining body 2, the maintaining body 2 is capable of falling away from the object on which the maintaining body 2 is maintained. For example, the electronic device is a smart watch, the maintaining body 2 is a strap, and the maintaining body 2 can be maintained on a wrist of the user; in a case that the user wants to remove the smart watch, the user may open the strap, and the strap of the smart watch, i.e., the maintaining body 2 is in a non-maintained state. Practically, if the electronic device is a smart bracelet or a smart bangle, the maintaining body 2 has only the maintained state, which is not limited in the present disclosure.

In a case that the display 3 is a flexible display and the maintaining body 2 is in a maintained state, the electronic device is maintained on an object, and the display 3 is deformed to present a curved surface to fit an external surface of the object. In a case that the maintaining body 2 is in the non-maintained state, the display 3 is deformed, such that the first display portion and the second display portion can be observed simultaneously. In this case, the display 3 may be deformed to present a curved surface with a great curvature, or bent in an opposite direction, even stretched to present a plane surface. In a case that the display 3 is stretched to present a plane surface, the electronic device may function as a smartphone.

The controller 4 may be a processor, for example, a CPU or a DSP, which is not limited in the present disclosure.

The posture sensor 6 is connected to the controller 4, which may be any one or a combination of a three-axis gyroscope, an acceleration sensor and a gravity sensor.

Hereinafter a control method according to the embodiment is described in conjunction with the above electronic device, and it is assumed that the display includes only a first display portion and a second display portion.

In a practical application, the display may include multiple display portions, and a display region for a content to be displayed may be determined among the multiple display portions, which is not limited in the present disclosure.

Figure 7:
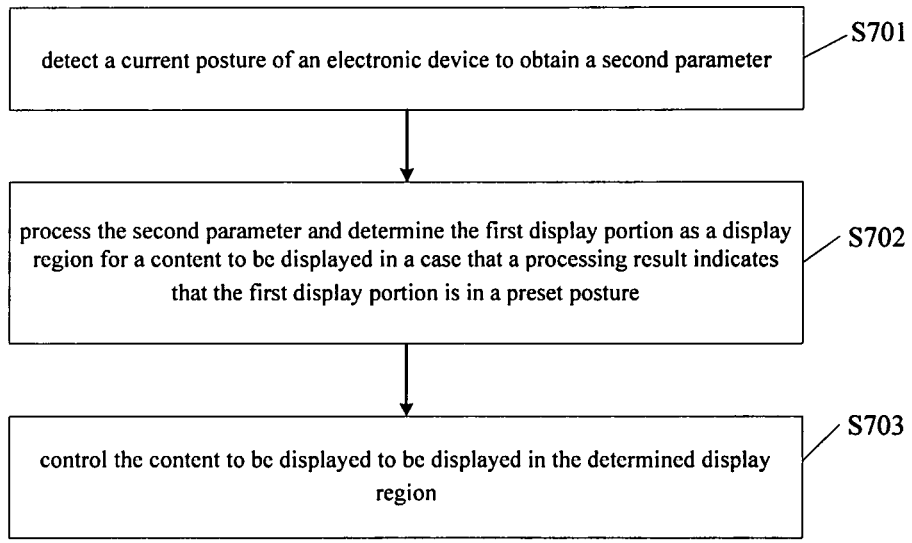
FIG. 7 is a flowchart of a control method according to the third embodiment of the present disclosure.

As shown in FIG. 7, the method includes step S701 to step S703.

In step S701, a current posture of an electronic device is sensed to obtain a second parameter.

Specifically, the posture sensor, for example, the three-axis gyroscope, can sense the current posture of the electronic device to obtain the second parameter, for example, acceleration values of the electronic device in the three axes.

It is to be noted that, since the sight tracking has a high demand on the environment where the observer is located, the sight position of the observer on the display may be inferred based on the current posture of the electronic device, that is, the current posture of the electronic device may indicate the sight position of the observer on the display.

In step S702, the second parameter is processed and the first display portion is determined as the display region for the content to be displayed in a case that a processing result indicates that the first display portion is in a preset posture.

Specifically, the controller processes the second parameter to determine whether the first display portion or the second display portion of the display is in the preset posture. The preset posture is a posture of a visible region for the user in a case that a wrist of the user is in a specified posture, for example, a posture matching a horizontal direction and opposite to a gravity direction, where the term "matching" means that the posture is parallel to or approximately parallel to the horizontal direction. Then the first display portion is determined as the display region for the content to be displayed, in a case that the processing result indicates that the first display portion is in the preset posture.

It is to be noted that, before the electronic device leaves a factory, the region on the display in the horizontal direction and opposite to the gravity direction is set to be the visible region for the user by default; and the first display portion is determined as the visible region for the user, in a case that the first display portion is in the preset posture.

Practically, if it is determined that no display portion of the display is in the preset posture based on the current posture of the electronic device, the controller controls the content to be displayed to be displayed in the original display position.

In step S703, the content to be displayed is controlled to be displayed in the determined display region.

That is, the content to be displayed is controlled to be displayed in the first display portion.

During a specific implementation process, in a case that the content to be displayed is displayed in the second display portion all the time, after the controller determines the first display portion as the display region for the content to be displayed, the controller controls the display region for the content to be displayed to be switched from the second display portion to the first display portion. In this case, the first display portion is in a first power consumption state, for example, the content to be displayed is displayed with a first backlight brightness.

Furthermore, since the content to be displayed is displayed in the first display portion, the second display portion is not in use, and the controller may control a power consumption mode of the second display portion to be switched from the first power consumption mode to the second power consumption mode, for example, the second display portion is turned off, the backlight brightness of the second display portion is decreased or a preset image is displayed in the second display portion, for example, a complete black image, a dark image or a dull color image. Practically, the second display portion may be controlled to be in the second power consumption mode in other ways, as long as power consumption in a case that the second display portion is in the first power consumption mode is greater than power consumption in a case that the second display portion is in the second power consumption mode, which is not limited in the present disclosure.

In a case that the content to be displayed is displayed in the visible region for the observer, i.e., the first display portion, the second display portion, i.e., a non-visible region for the observer, is controlled to be in the second power consumption state, thereby greatly reducing power consumption of the display, reducing a power consumption of the whole electronic device and extending battery life.

In another embodiment, the content to be displayed may be a useful content, i.e., a content which the user wants to observe, for example, a password input component in an unlocking interface and a time display component in a standby interface. In a case that the useful content is displayed in the first display portion, the controller may control the second display portion to display a useless content, for example, other components in the unlocking interface and an application list in a standby interface, to ensure the integrity of the display interface, in addition to control the second display portion to be in the second power consumption state. In this way, only the useful content is displayed in the visible region for the user, i.e., the first display portion, and it is convenient for the user to observe the useful content.

Practically, the useful content and the useless content may refer to other contents, which is not limited in the present disclosure.

In another embodiment, step S701 may further include: determining whether the content to be displayed is a preset content; and collecting a first parameter indicating a sight position of the observer on the display in a case that the content to be displayed is determined to be the preset content.

Specifically, firstly, it is determined whether the content to be displayed is the preset content, for example, a short message sent from a specified sender, a photo in an album which can be observed only by the observer oneself or an e-mail with a high priority. If the content to be displayed is determined to be the preset content, a first parameter indicating a sight position of an observer on the display is collected by the sight sensor. Then the first parameter is processed and the first display portion is determined as a display region for the content to be displayed in a case that a processing result indicates that the sight position is in the first display portion. That is, the preset content is displayed in a visible region for the user, thereby avoiding omission of the user's important information and preventing privacy of the user from being leaked.

In the embodiment, the content to be displayed is controlled to be displayed in the first display portion being in the preset posture, in a case that a posture of the first display portion is determined based on the current posture of the electronic device. The preset posture is used to infer a visible region for the user on the display. Therefore, the user can directly observe the content to be displayed, and it is convenient for the user. In addition, the non-visible region for the user is controlled to be in the second power consumption state, thereby reducing power consumption of the electronic device and extending a battery life.

Fourth Embodiment

An electronic device is provided according to the fourth embodiment, which may be a smart watch and a smart bracelet or the like. As shown in FIG. 1, the electronic device may include a body 1, a maintaining body 2, a display 3 and a controller 4.

At least one electronic component is accommodated in the body 1, for example, a processor, a power management module, and a controller, which can achieve at least one function.

The maintaining body 2 is arranged on the body 1 and has at least a maintained state. The maintaining body 2 is capable of functioning as at least one portion of a ring or at least one portion of an approximate ring meeting a first condition. The body 1 is maintained on an object via the maintaining body 2.

It is to be noted that, an opening is provided on the ring, to form the approximate ring described above, the approximate ring meeting the first condition means that a length of the opening of the approximate ring is short and the length of the opening is less than a caliber of an object on which the maintaining body 2 is maintained in a case that the maintaining body 2 is in the maintained state, that is, the length of the opening is less than a half of a circumference of the approximate ring, and a central angle of the opening is less than 180 degrees.

Furthermore, in a case that the maintaining body 2 is in the maintained state, the ring or the approximate ring can be maintained on or surround a columnar object. In this case, a caliber of the columnar object has to meet a second condition, that is, the caliber of the columnar object is less than the caliber of the ring or the approximate ring. In order to prevent the maintaining body 2 in the maintained state from falling away from the columnar object, a caliber of at least one end of the columnar object is greater than the caliber of the ring or the approximate ring.

During a specific implementation process, the maintaining body 2 and the body 1 may be connected in the following two ways, but the connection way is not limited in the present disclosure.

In a first way, the body 1 has two opposite ends and the maintaining body 2 is connected to the two ends. In this way, a ring or an approximate ring may be formed with the maintaining body 2 and the body 1, and the maintaining body 2 is a portion of the ring or the approximate ring. In this case, the maintaining body 2 is in a maintained state and can maintain the body 1 on an object. The object may be a columnar object, for example, a wrist of a person.

Furthermore, the maintaining body 2 may be a whole component connected to the two ends of the body 1, or may be composed of multiple sub-components. For example, as shown in FIG. 2A, the maintaining body 2 is a strap-shaped component having a first end and a second end, the first end is connected to one end of the body 1, and the second end is connected to the other end of the body 1. In a case that the first end and the second end of the maintaining body 2 are connected to two ends of the body 1 respectively, the maintaining body 2 is in a maintained state and is capable of maintaining the body 1 on the above object. Alternatively, as shown in FIG. 2B, the maintaining body 2 includes two sub-components; one end of a first sub-component 21 is connected to one end of the body 1, and the other end of the first sub-component 21 is a free end; and one end of a second sub-component 22 is connected to the other end of the body 1, and the other end of the second sub-component 22 is a free end. In this case, the maintaining body 2 is shaped like a strap of a smart watch, and the maintaining body 2 is in a maintained state and is capable of maintaining the body 1 on the above object, in a case that the free end of the first sub-component 21 is connected to the free end of the second sub-component 22.

In a second way, the body 1 is arranged on an external surface of the maintaining body 2. For example, the body 1 is attached on the external surface of the maintaining body 2 or the body 1 may be embedded into the maintaining body 2 and be exposed at the external surface of the maintaining body 2. Since the maintaining body 2 bears the body 1, the maintaining body 2 is a whole component and has a first end and a second end. In a case that the first end and the second end of the maintaining body 2 are connected to each other, a ring or an approximate ring is formed with the maintaining body 2 itself. In this case, the maintaining body 2 is in a maintained state and is capable of maintaining the body 1 on the above object.

It is to be noted that, the above-described "connection way" may be a maintained connection or a separable connection. The maintained connection may include screw jointing, welding and bonding and son on, and the separable connection may include engaging and magnetic adhesion and so on.

In the embodiment, a display 3 and a controller 4 are further arranged in the body 1.

Figures 8, 9:
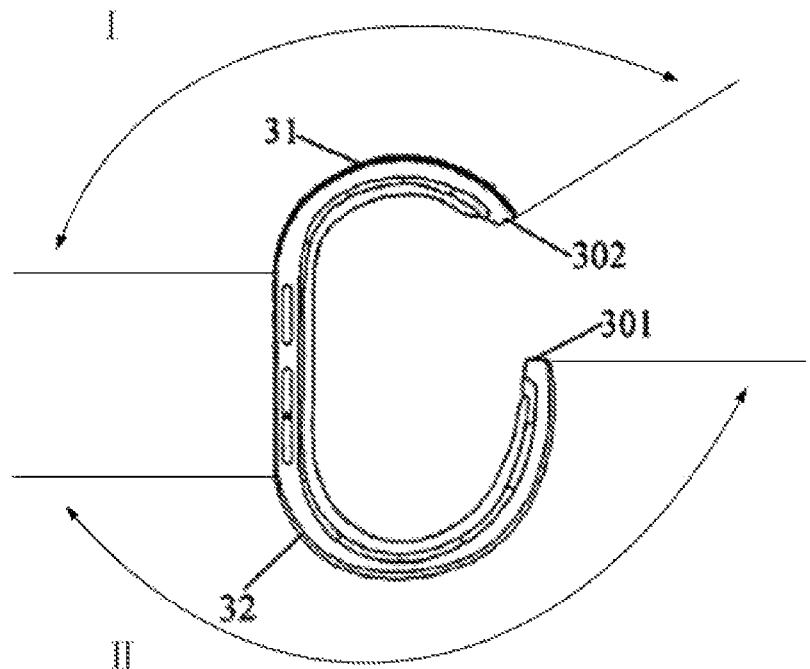
FIG. 8 is a schematic diagram of a position of a first display portion in a display according to the fourth embodiment of the present disclosure.
FIG. 9 is a flowchart of a control method according to the fourth embodiment of the present disclosure.

Specifically, the display 3 is arranged on an external surface of the body 1, i.e., an outer surface of the ring/the approximate ring. In the embodiment, in a case that the maintaining body 2 is in the maintained state, the display 3 has an effective display region bounded by two sets of edges, which includes one set of opposite straight edges and one set of opposite curved edges. As shown in FIG. 8, the set of straight edges are a first edge 301 and a second edge 302, and a display direction of the content to be displayed is a direction from the second edge 302 towards the first edge 301; in this case, a distance between the first display portion 31 and the first edge 301 is greater than a distance between the second display portion 32 and the first edge 301, and the effective display region of the display 3 includes at least the first display portion and the second display portion, the first display portion 31 corresponds to the visible region I and the second display portion 32 corresponds to the visible region II. Furthermore, if the display 3 is a two-dimensional curved surface, the two sets of edges in the effective display region are curved edges.

In different setting ways of the display, the effective display region of the display is different. For example, the display may be a portion of a ring or at least one portion of an approximate ring meeting the first condition, in this case, the effective display region of the display is a display region of the whole display.

Alternatively, the display 3 may be the whole ring, that is, a ring is formed the display 3 itself. It is assumed that the display 3 includes four portions, i.e., a region close to a back side of a hand of the user, a region close to a thumb side of the user, a region close to a hand center side of the user and a region close to a little finger side of the user. The effective display region of the display 3 may be the region close to the back side of the hand of the user, the region close to the thumb side of the user and/or the region close to the hand center side of the user, and a non-effective display region may be the region close to the little finger side of the user.

The first display portion may be determined to be the region close to the thumb side of the user or the region close to the hand center side of the user.

In a practical application, the display 3 may be a curved display which is not deformable or a flexible display which is deformable. In a case that the maintaining body 2 is in the maintained state, the first display portion and the second display portion cannot be observed simultaneously, that is, in a case that the body 1 is maintained on an object via the maintaining body 2, the whole display 3 cannot be observed completely by an observer simultaneously, and the observer can only observe the first display portion or the second display portion. Furthermore, in addition to the maintained state, the maintaining body 2 may have a non-maintained state. In a case that the first end of the maintaining body 2 is separated from the second end of the maintaining body 2, the maintaining body 2 is capable of falling away from the object on which the maintaining body 2 is maintained. For example, the electronic device is a smart watch, the maintaining body 2 is a strap, and the maintaining body 2 can be maintained on a wrist of the user; in a case that the user wants to remove the smart watch, the user may open the strap, and the strap, i.e., the maintaining body 2, is in a non-maintained state. Practically, if the electronic device is a smart bracelet or a smart bangle, the maintaining body 2 has only the maintained state, which is not limited in the present disclosure.

In a case that the display 3 is a flexible display and the maintaining body 2 is in a maintained state, the electronic device is maintained on an object, and the display 3 is deformed to present a curved surface to fit an external surface of the object. In a case that the maintaining body 2 is in the non-maintained state, the display 3 is deformed, such that the first display portion and the second display portion can be observed simultaneously. In this case, the display 3 may be deformed to present a curved surface with a great curvature, or bent in an opposite direction, even stretched to present a plane surface. In a case that the display 3 is stretched to present a plane surface, the electronic device may function as a smartphone.

The controller 4 may be a processor, for example, a CPU or a DSP, which is not limited in the present disclosure.

In another embodiment, the electronic device further includes an input overlapping with the display 3 and covering the display 3, that is, the electronic device includes a touch display screen.

Hereinafter a control method according to the embodiment is described in conjunction with the above electronic device, and it is assumed that an effective display region of the display includes only a first display portion and a second display portion.

In a practical application, the effective display region of the display may include multiple display portions, and a display region for a content to be displayed may be determined among the multiple display portions, which is not limited in the present disclosure.

As shown in FIG. 9, the method includes step S901 to step S902.

In step S901, the display region for the content to be displayed is determined among the first display portion and the second display portion, based on the content to be displayed.

During a specific implementation process, step S901 may include but not limited to the following three cases.

In a first case, step S901 may include: determining whether the content to be displayed is a preset content; and determining the first display portion as the display region for the content to be displayed in a case that the content to be displayed is determined to be the preset content.

Specifically, the content to be displayed may involve privacy of the user, for example, a photo which is marked to be observed only by the user oneself or a message sent from a specified sender, the controller determines whether the content to be displayed is the preset content, and then determines the first display portion as the display region for the content to be displayed in a case that the content to be displayed is determined to be the preset content.

Figure 10:
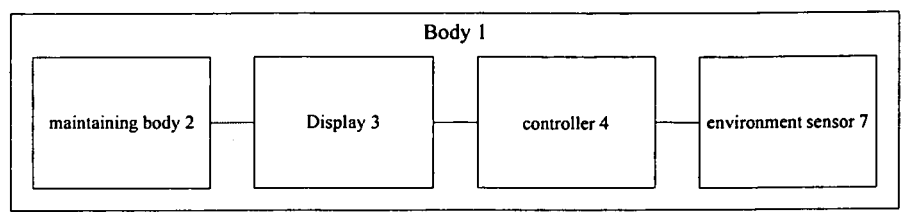
FIG. 10 is a schematic structural diagram of an electronic device according to the fourth embodiment of the present disclosure.

In a second case, as shown in FIG. 10, the electronic device further includes an environment sensor 7, such as a distance sensor and an image acquisition sensor. The environment sensor 7 is configured to sense an environment where the electronic device is located currently to obtain an environmental parameter.

Accordingly, step S901 may include: determining whether the content to be displayed is a preset content; sensing an environment where the electronic device is located currently to obtain an environmental parameter, in a case that the content to be displayed is determined to be the preset content; and determining, based on the environmental parameter, the display region for the content to be displayed among the first display portion and the second display portion.

Specifically, firstly the controller determines whether the content to be displayed is the preset content. The content to be displayed may involve a privacy content of the user similar to the first case, or may include other contents practically, which is not limited in the present disclosure. Then, in a case that the controller determines that the content to be displayed is the preset content, the environment sensor senses an environment where the electronic device is located currently to obtain an environmental parameter. For example, in a case that the environment sensor is a distance sensor, the distance sensor senses and obtains a distance between an object around the electronic device and the electronic device; in a case that the environment sensor is an image acquisition sensor, the image acquisition sensor acquires an image of an environment around the electronic device, and the controller processes the image to obtain a distance between an object around the electronic device and the electronic device. Practically, the distance between the object around the electronic device and the electronic device may be obtained using other environment sensors.

After the environmental parameter is obtained, the controller determines the display region for the content to be displayed among the first display portion and the second display portion based on the parameter. For example, the controller determines an object having a minimum value of the distance from the electronic device as a target object, among the objects around the electronic device, which are obtained by the environment sensor, and determines a relative position relation between the target object and the display; or the controller determines an object having a value of a distance from the electronic device within a preset value range as a target object and determines a relative position relation between the target object and the display. Then the controller may determine the first display portion or the second display portion as the display region for the content to be displayed based on the above relative position relation.

For example, it is assumed that the electronic device is a smart watch worn on a wrist of the user, firstly the controller determines that the content to be displayed is a photo which can be observed only by the user oneself, and the image acquisition sensor array arranged on the display acquires an image of an environment. Then the controller identifies the image and determines that there are three objects around the smart watch, i.e., one object which is located at the inside of the wrist of the user and has a distance of 15 cm from the electronic device, and the other two objects which are located at the outside of the wrist of the user and have distances of 8 cm and 25 cm respectively from the electronic device. If a preset value range is between 10 cm and 20 cm, the controller determines the object which has a distance of 15 cm from the electronic device as the target object and selects a display portion close to the inside of the wrist of the user as the display region for the content to be displayed, for example, the first display portion.

In a third case, a content for the same application may involve the privacy of the user sometimes, but may not involve the privacy of the user sometimes. The content involving the privacy of the user is displayed at a specified position, for example, the inside of the wrist of the user, and the content not involving the privacy of the user may be displayed according to an original display strategy. In order to process the contents differently, step S901 may include: determining whether the content to be displayed is a content of a preset type; analyzing the content to be displayed in a case that the content to be displayed is determined to be the content of the preset type; and determining, based on an analysis result, the display region for the content to be displayed among the first display portion and the second display portion.

Specifically, the controller filters the content to be displayed, and not all types of contents are displayed differently. Firstly, the controller determines whether the content to be displayed is a content of a preset type, for example, the controller determines whether the content to be displayed is a word message, a picture, a video or an input component. In a case that the content to be displayed is determined to be the content of the preset type, the controller analyzes the content to be displayed to determine whether the content involves the privacy of the user. In a case that an analysis result indicates that the content to be displayed involves the privacy of the user, for example, an application interface of the content to be displayed is a preset interface or the content to be displayed has a preset identifier, the controller may determine the first display portion as the display region for the content to be displayed. In a case that the analysis result indicates that the content to be displayed does not involve the privacy of the user, the controller may determine the display region for the content to be displayed according to the original display strategy.

For example, the controller determines whether the content to be displayed is a virtual keyboard. In a case that the content to be displayed is determined to be the virtual keyboard, the controller determines whether the application interface of the virtual keyboard is a preset interface, such as a password input interface or an electronic payment interface. If the application interface of the virtual keyboard is the password input interface, the controller determines that the virtual keyboard involves the privacy of the user, and determines the first display portion as a display region for the virtual keyboard, and other display regions portions of the password input interface may be in the first display portion or the second display portion.

Alternatively, the controller determines whether the content to be displayed is a photo. In a case that the content to be displayed is determined to be the photo, the controller determines whether the photo has an identifier of "observed only by the user oneself". If the photo has the identifier, the controller determines that the photo involves the privacy of the user, and determines the first display portion as the display region for the photo.

In a practical application, in a case that the analysis result indicates that the application interface of the content to be displayed is the preset interface and the first display portion is determined as the display region for the content to be displayed, an input operation from an input portion in the input corresponding to the first display portion is received and an operation instruction is generated. The controller performs the operation instruction to achieve an input function. For example, in a case that the first display portion is determined as the display region for the virtual keyboard, the user may perform an input operation in the input portion of the input corresponding to the first display portion, that is, the use inputs a password. Then the input receives the operation and generates an operation instruction. The controller performs the operation instruction to input the password.

In a practical application, step S901 may include other cases, which is not limited in the present disclosure.

In step S902, the content to be displayed is controlled to be displayed in the determined display region.

In the embodiment, the controller can determine the display region for the content to be displayed among the first display portion and the second display portion, based on the content to be displayed. In a case that the content to be displayed involves the privacy of the user, the content to be displayed may be controlled to be displayed in the first display portion. Therefore, in a case that the content to be displayed is displayed in the first display portion, other persons cannot see the content since the first display portion is located at the inside of the wrist of the user, thereby protecting the privacy of the user, greatly improving an intelligence level of the electronic device, enhancing information safety of the electronic device, and providing good user experience.

Fifth Embodiment

An electronic device is provided according to the fifth embodiment, which is the same as the electronic device according to the first embodiment to the fourth embodiment.

Figure 11:
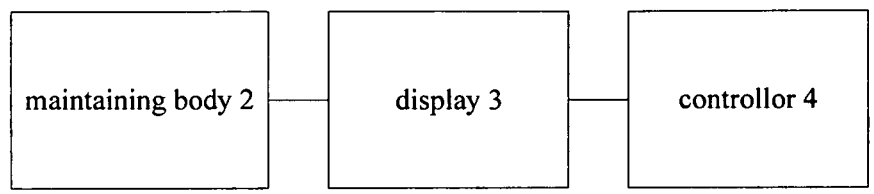
FIG. 11 is a schematic structural diagram of an electronic device according to a fifth embodiment of the present disclosure.

As shown in FIG. 11, the electronic device includes a maintaining body 2, a display 3 and a controller 4. The maintaining body 2 has at least a maintained state, the maintaining body 2 is capable of functioning as at least one portion of a ring or at least one portion of an approximate ring meeting a first condition, and the electronic device is maintained on an object via the maintaining body 2. The display 3 includes at least a first display portion and a second display portion, and the first display portion and the second display portion cannot be observed simultaneously in a case that the maintaining body 2 is in the maintained state. The controller 4 is configured to determine a display region for a content to be displayed among the first display portion and the second display portion, and control the content to be displayed to be displayed in the determined display region.

In the above technical solution, the electronic device may further include: a sight sensor configured to collect a first parameter indicating a sight position of an observer on the display 3. The controller 4 is configured to process the first parameter and determine the first display portion as the display region for the content to be displayed in a case that a processing result indicates that the sight position is in the first display portion.

In the above technical solution, the sight sensor may be an image acquisition sensor configured to acquire an image in an observation region of the display 3, and an acquisition region of the image acquisition sensor overlaps with the observation region. The controller 4 is configured to process the image and determine the first display portion as the display region for the content to be displayed in a case that a processing result indicates that an observer exists in the observation region and the sight position of the observer is in the first display portion.

In the above technical solution, the electronic device may further include: a posture sensor configured to sense a current posture of the electronic device to obtain a second parameter. The controller 4 is configured to process the second parameter and determine the first display portion as the display region for the content to be displayed in a case that a processing result indicates that the first display portion is in a preset posture.

In the above technical solution, the controller 4 is configured to process the second parameter and determine the first display portion as the display region for the content to be displayed in a case that the processing result indicates that the first display portion is in a posture matching a horizontal direction and opposite to the gravity direction.

In the above technical solution, the controller 4 is configured to control the display region for the content to be displayed to be switched from the second display portion to the first display portion in a case that the first display portion is determined as the display region for the content to be displayed, and the first display portion is in a first power consumption state.

In the above technical solution, the controller 4 is configured to control a power consumption mode of the second display portion to be switched from the first power consumption mode to the second power consumption mode in a case that the display region for the content to be displayed is switched from the second display portion to the first display portion. Power consumption in a case that the second display portion is in the first power consumption mode is greater than power consumption in a case that the second display portion is in the second power consumption mode.

In the above technical solution, the controller 4 is configured to determine the display region for the content to be displayed among the first display portion and the second display portion, based on the content to be displayed.

In the above technical solution, the electronic device includes a first edge and a second edge opposite to each other, a display direction of the content to be displayed is a direction from the second edge towards the first edge, and a distance between the first display portion and the first edge is greater than a distance between the second display portion and the first edge. The controller 4 is configured to determine whether the content to be displayed is a preset content, and determine the first display portion as the display region for the content to be displayed in a case that the content to be displayed is determined to be the preset content.

In the above technical solution, the electronic device may further include an environment sensor configured to sense an environment where the electronic device is located currently to obtain an environmental parameter, in a case that the content to be displayed is determined to be the preset content. The controller 4 is configured to determine whether the content to be displayed is a preset content, and determine the display region for the content to be displayed among the first display portion and the second display portion, based on the environmental parameter.

In the above technical solution, the controller 4 is configured to determine whether the content to be displayed is a content of a preset type, where the content of the preset type can be displayed in the first display portion and/or the second display portion; analyze the content to be displayed in a case that the content to be displayed is determined to be the content of the preset type; and determine, based on an analysis result, a display region for the content to be displayed among the first display portion and the second display portion.

In the above technical solution, the controller 4 is configured to determine the first display portion as the display region for the content to be displayed in a case that the analysis result indicates that an application interface of the content to be displayed is a preset interface; or determine the first display portion as the display region for the content to be displayed in a case that the analysis result indicates that the content to be displayed has a preset identifier.

In the above technical solution, the electronic device may further include an input overlapping with the display 3, the input covers the display 3 and is configured to receive an input operation from an input portion of the input corresponding to the first display portion and generate an operation instruction, in a case that the analysis result indicates that the application interface of the content to be displayed is the preset interface and the first display portion is determined as the display region for the content to be displayed. The controller 4 is further configured to execute an operation instruction to achieve an input function.

In the above technical solution, the maintaining body 2 further has a non-maintained state. In a case that the maintaining body 2 is in the non-maintained state, the first display portion and the second display portion can be observed simultaneously.

It is to be understood by those skilled in the art that the embodiments of the present disclosure may be implemented as a method, a system or a computer program product. Hence, the present disclosure may be embodied as only hardware embodiments, only software embodiments or embodiments of a combination of software and hardware. In addition, the present disclosure may be embodied as a computer program product implemented on a computer available storage medium (including but not limited to a magnetic disk memory, and an optical memory) containing computer available program codes.

The present disclosure is described by referring to flowcharts and/or block diagrams of methods, devices (systems) and computer program products according to the embodiments of the present disclosure. It is to be understood that each flow and/or block in the flowcharts and/or block diagrams and a combination of flows and/or blocks in the flowcharts and/or block diagrams may be implemented by computer program instructions. Theses computer program instructions may be provided to a general-purpose computer, a dedicated computer, an embedded processor or processors of other programmable data processing devices to generate a machine language, such that the instructions executed by the computer or the processors of other programmable data processing devices generate a device for achieving functions specified in one or more flow in the flowcharts and/or one or more block in the block diagrams.

These computer program instructions may also be stored in a computer readable memory which can guide the computer or other programmable data processing devices to operate in a specified mode, such that the instructions stored in the computer readable memory generate a product including an instruction device, which achieves functions specified in one or more flow in the flowcharts and/or one or more blocks in the block diagrams.

These computer program instructions may also be loaded to the computer or other programmable data processing devices, such that a series of operation steps are performed on the computer or other programmable devices to generate processing implemented by the computer, and hence the instructions executed on the computer or other programmable devices perform steps for achieving functions specified in one or more flow in the flowcharts and/or one or more block in the block diagrams.

The embodiments of the present disclosure are described above and are not used to limit the scope of protection of the present disclosure.

The invention claimed is:

1. An electronic device, comprising:
    a maintaining body having at least a maintained state, wherein the maintaining body is capable of functioning as at least one portion of a ring or at least one portion of an approximate ring meeting a first condition and the electronic device is maintained on an object via the maintaining body;
    a display comprising at least a first display portion and a second display portion, wherein the first display portion and the second display portion are not observed simultaneously in a case that the maintaining body is in the maintained state; and
    a controller configured to determine a display region for a content to be displayed among the first display portion and the second display portion, and control the content to be displayed to be displayed in the determined display region,
    wherein the first condition comprises that a length of an opening of the approximate ring is less than a caliber of the object on which the maintaining body is maintained in a case that the maintaining body is in the maintained state.

2. The electronic device according to claim 1, further comprising: a sight sensor configured to collect a first parameter indicating a sight position of an observer on the display,
    wherein the controller is configured to process the first parameter and determine the first display portion as the display region for the content to be displayed in a case that a processing result indicates that the sight position is in the first display portion.

3. The electronic device according to claim 2, wherein the sight sensor is an image acquisition sensor configured to acquire an image in an observation region of the display, and an acquisition region of the image acquisition sensor overlaps with the observation region; and the controller is configured to process the image and determine the first display portion as the display region for the content to be displayed in a case that a processing result indicates that an observer exists in the observation region and the sight position of the observer is in the first display portion.

4. The electronic device according to claim 1, further comprising: a posture sensor configured to sense a current posture of the electronic device to obtain a second parameter, wherein the controller is configured to process the second parameter and determine the first display portion as the display region for the content to be displayed in a case that a processing result indicates that the first display portion is in a preset posture.

5. The electronic device according to claim 4, wherein the controller is configured to process the second parameter and determine the first display portion as the display region for the content to be displayed in a case that the processing result indicates that the first display portion is in a posture matching a horizontal direction and opposite to a gravity direction.

6. The electronic device according to claim 2, wherein the controller is configured to control the display region for the content to be displayed to be switched from the second display portion to the first display portion in a case that the first display portion is determined as the display region for the content to be displayed, wherein the first display portion is in a first power consumption state.

7. The electronic device according to claim 6, wherein the controller is configured to control a power consumption mode of the second display portion to be switched from a first power consumption mode to a second power consumption mode in a case that the display region for the content to be displayed is controlled to be switched from the second display portion to the first display portion, and power consumption in a case that the second display portion is in the first power consumption mode is greater than power consumption in a case that the second display portion is in the second power consumption mode.

8. The electronic device according to claim 1, wherein the controller is configured to determine, based on the content to be displayed, the display region for the content to be displayed among the first display portion and the second display portion.

9. The electronic device according to claim 8, comprising a first edge and a second edge opposite to each other, wherein a display direction of the content to be displayed is a direction from the second edge towards the first edge, and a distance between the first display portion and the first edge is greater than a distance between the second display portion and the first edge; and wherein the controller is configured to determine whether the content to be displayed is a preset content; and determine the first display portion as the display region for the content to be displayed in a case that the content to be displayed is determined to be the preset content.

10. The electronic device according to claim 8, further comprising an environment sensor configured to sense an environment where the electronic device is located currently to obtain an environmental parameter in a case that the content to be displayed is determined to be a preset content, wherein the controller is configured to determine whether the content to be displayed is the preset content; and determine, based on the environmental parameter, the display region for the content to be displayed among the first display portion and the second display portion.

11. The electronic device according to claim 8, wherein the controller is configured to determine whether the content to be displayed is a content of a preset type, wherein the content of the preset type is capable of being displayed in the first display portion and/or the second display portion; analyze the content to be displayed in a case that the content to be displayed is determined to be the content of the preset type; and determine, based on an analysis result, the display region for the content to be displayed among the first display portion and the second display portion.

12. The electronic device according to claim 11, wherein the controller is configured to determine the first display portion as the display region for the content to be displayed, in a case that the analysis result indicates that an application interface of the content to be displayed is a preset interface; or determine the first display portion as the display region for the content to be displayed, in a case that the analysis result indicates that the content to be displayed has a preset identifier.

13. The electronic device according to claim 12, further comprising: an input overlapping with the display, wherein the input covers the display and is configured to receive an input operation from an input portion of the input corresponding to the first display portion and generate an operation instruction, in a case that the analysis result indicates that the application interface of the content to be displayed is the preset interface and the first display portion is determined as the display region for the content to be displayed; and wherein the controller is further configured to execute the operation instruction to achieve an input function.

14. The electronic device according to claim 1, wherein the maintaining body further has a non-maintained state, and the first display portion and the second display portion are observed simultaneously in a case that the maintaining body is in the non-maintained state.

15. A control method, comprising:

determining a display region for a content to be displayed in a first display portion and a second display portion of a display arranged on an electronic device, wherein the electronic device comprises a maintaining body and the display, the maintaining body has at least a maintained state, the maintaining body is capable of functioning as at least one portion of a ring or at least one portion of an approximate ring meeting a first condition, and the electronic device is maintained on an object via the maintaining body; and the display comprises at least a first display portion and a second display portion, and the first display portion and the second display portion are not observed simultaneously in a case that the maintaining body is in the maintained state; and controlling the content to be displayed to be displayed in the determined display region, wherein the first condition comprises that a length of an opening of the approximate ring is less than a caliber of the object on which the maintaining body is maintained in a case that the maintaining body is in the maintained state.

16. The method according to claim 15, wherein the determining a display region for a content to be displayed in a first display portion and a second display portion of a display arranged on an electronic device comprises:

collecting a first parameter indicating a sight position of an observer on the display; and processing the first parameter and determining the first display portion as the display region for the content to be displayed in a case that a processing result indicates that the sight position is in the first display portion.

17. The method according to claim 16, wherein the collecting a first parameter indicating a sight position of an observer on the display comprises:

acquiring an image in an observation region of the display; and the processing the first parameter and determining the first display portion as the display region for the content to be displayed in a case that a processing result indicates that the sight position is in the first display portion comprises:

processing the image and determining the first display portion as the display region for the content to be displayed in a case that a processing result indicates that an observer exists in the observation region and the sight position of the observer is in the first display portion.

18. The method according to claim 15, wherein the determining a display region for a content to be displayed in a first display portion and a second display portion of a display arranged on an electronic device comprises:

sensing a current posture of the electronic device to obtain a second parameter; and processing the second parameter and, in a case that a processing result indicates that the current posture is a preset posture, determining the first display portion corresponding to the preset posture as the display region for the content to be displayed.

19. The method according to claim 18, wherein the processing the second parameter and, in a case that a processing result indicates that the current posture is a preset posture, determining the first display portion corresponding to the preset posture as the display region for the content to be displayed comprises:

processing the second parameter and determining the first display portion as the display region for the content to be displayed in a case that the processing result indicates that the first display portion is in a posture matching a horizontal direction and opposite to a gravity direction.

20. The method according to claim 16, wherein after the determining the first display portion as the display region for the content to be displayed, the method further comprises:

controlling the display region for the content to be displayed to be switched from the second display portion to the first display portion, wherein the first display portion is in a first power consumption state.

21. The method according to claim 20, wherein after the controlling the display region for the content to be displayed to be switched from the second display portion to the first display portion, the method further comprises:

controlling a power consumption mode of the second display portion to be switched from a first power consumption mode to a second power consumption mode, wherein power consumption in a case that the second display portion is in the first power consumption mode is greater than power consumption in a case that the second display portion is in the second power consumption mode.

22. The method according to claim 15, wherein the determining a display region for a content to be displayed in a first display portion and a second display portion of a display arranged on an electronic device comprises:

determining whether the content to be displayed is a preset content; and determining the display region for the content to be displayed among the first display portion and the second display portion, in a case that the content to be displayed is determined to be the preset content.

23. The method according to claim 15, wherein the determining a display region for a content to be displayed in a first display portion and a second display portion of a display arranged on an electronic device comprises:

determining, based on the content to be displayed, the display region among the first display portion and the second display portion.

24. The method according to claim 23, wherein the determining, based on the content to be displayed, the display region among the first display portion and the second display portion comprises:

determining whether the content to be displayed is a preset content;

sensing an environment where the electronic device is located currently to obtain an environmental parameter in a case that the content to be displayed is determined to be the preset content; and determining, based on the environmental parameter, the display region among the first display portion and the second display portion.

25. The method according to claim 23, wherein the determining, based on the content to be displayed, the display region among the first display portion and the second display portion comprises:

determining whether the content to be displayed is a content of a preset type, wherein the content of the preset type is capable of being displayed in the first display portion and/or the second display portion;

analyzing the content to be displayed in a case that the content to be displayed is determined to be the content of the preset type; and determining, based on an analysis result, the display region for the content to be displayed among the first display portion and the second display portion.

26. The method according to claim 25, wherein the determining, based on an analysis result, the display region for the content to be displayed among the first display portion and the second display portion comprises:

determining the first display portion as the display region for the content to be displayed, in a case that the analysis result indicates that an application interface of the content to be displayed is a preset interface; or determining the first display portion as the display region for the content to be displayed, in a case that the analysis result indicates that the content to be displayed has a preset identifier.

27. The method according to claim 26, wherein after the determining the first display portion as the display region for the content to be displayed, in a case that the analysis result indicates that an application interface of the content to be displayed is a preset interface, the method further comprises:

receiving an input operation from an input portion of the input corresponding to the first display portion and generating an operation instruction, wherein the input overlaps with the display and covers the display; and executing the operation instruction to achieve an input function.

* * * * *